Sept. 29, 1925.
W. E. WILLIAMS
1,555,048
AIR VALVE CONNECTION FOR PNEUMATIC TIRES FOR AUTOMOBILE WHEELS
Filed Jan. 26, 1920
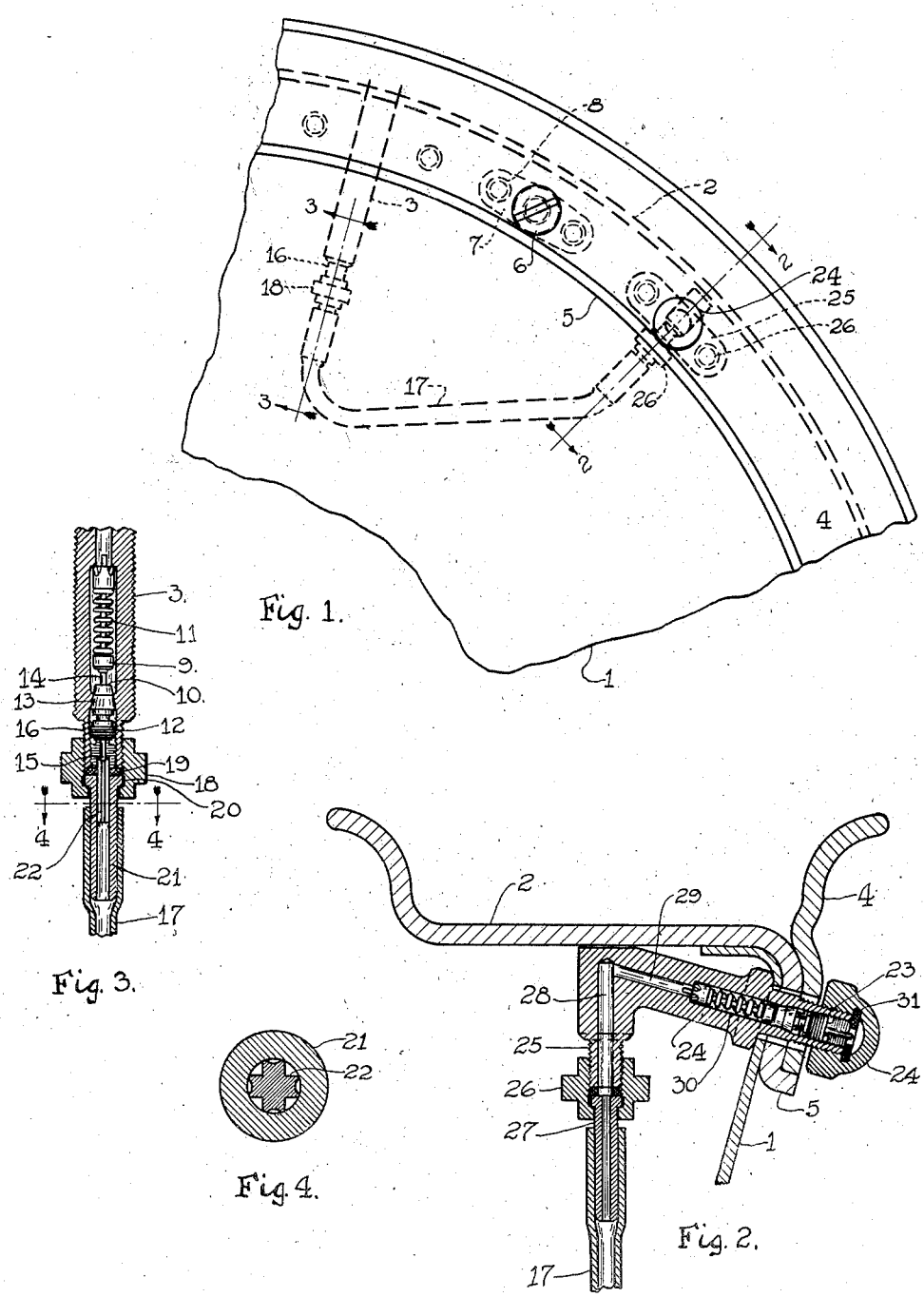
WITNESS
J. B. Jefferson
INVENTOR.
W. E. Williams Patented Sept. 29, 1925.

1,555,048

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

AIR-VALVE CONNECTION FOR PNEUMATIC TIRES FOR AUTOMOBILE WHEELS.

Application filed January 26, 1920. Serial No. 354,101.

*To all whom it may concern:*

Be it known that I, WILLIAM ERASTUS WILLIAMS, a citizen of the United States, a resident of Chicago, in the county of Cook and State of Illinois, have invented a new and useful Improvement in Air-Valve Connections for Pneumatic Tires for Automobile Wheels, of which the following is a specification.

My invention relates to the air valves used on pneumatic tires which are used upon what are known as disk wheels, although in some instances the invention may be applicable to other types of wheels.

In the use of a disk wheel bearing a pneumatic tire, trouble is encountered in getting at the air valve to inflate the tire when the disk of the wheel is located outside or in front of the center of the wheel, as the air valve usually extends down into the central plane of the wheel.

It has been customary to cut a hole in the disk opposite the air valve, which permits access to the stem of the air valve either from the front or the rear, depending on the location of the disk in relation to the valve stem. Sometimes this apparatus is covered either with a gate or cover of some sort and sometimes it is left open.

In either case where a gate in the disk to the valve is used, it detracts from the appearance of the disk and the preferred custom has been to get access to the air valve from the rear so as to leave the front face of the disk a smooth surface. It is unhandy and disagreeable to get at the valve from the rear and this is one of the serious objections to a disk wheel with a pneumatic tire.

The object of my invention is to provide for conveniently inflating or deflating, from the front face of the wheel, while preserving substantially the smooth clean appearance of the wheel's front face.

The invention is set forth in the claims.

Reference will be had to the accompanying drawings, in which Figure 1 is a small sectional elevation of a portion of a disk wheel, showing so much of the rim thereof as is necessary for clearness of understanding of my invention.

Figure 2 is a transverse section on line 2—2 of Figure 1.

Figure 3 is a transverse section on line 3—3 of Figure 1.

Figure 4 is a transverse section on line 4—4 of Figure 3, showing on a larger scale only a cross section of the air pipe.

In the drawing 1 indicates the disk of my wheel, only a part of which is shown. 2 is the main supporting rim for the rubber tire which tire is not here shown. The air stem or valve stem of a pneumatic tire is shown in dotted lines in Figure 1 and is indicated by 3. This represents the ordinary valve stem of any ordinary pneumatic tire. The outer end of this stem is shown in section in Figure 3.

The outside flange of my wheel as here shown is indicated by 4 and is a separate piece.

In this particular type of a wheel the main tread of the rim is turned over into an inward projecting flange as indicated by 5, which co-acts with the flange 4 to hold the latter in place, through the medium of a series of screws 6 which are screwed into small blocks shown in dotted lines as indicated by 7 in Figure 1. These blocks are secured by rivets shown in dotted lines as is indicated by 8, which rivets are secured only to the flange 5 of the main rim and thus the screws 6 are secured into these blocks 7 and thus secure the flange 4 to the main rim. A number of these screws are distributed around the rim to hold the flange 4 in place.

In Figure 3 there is shown the ordinary tire valve mechanism for closing the exit of the air from the stem 3. This is a common ordinary valve arrangement and consists essentially of the valve block 9, usually made of rubber, which seats on the valve seat 10 through the medium of the spring 11 in a manner commonly found as standard practice. The valve seat 10 is connected to a block which is secured in place by a screw washer 12, making a tight permanent seal around a block 13 which holds the valve seat 10. The latter block is normally rubber faced, the same as the face of the block 9. The valve stem of the valve 9 is indicated by 14 and extends down and terminates at 15 and in this position, shown in Figure 3, the passageway is open as the valve block 9 is lifted from its valve seat 10 and the spring 11 is held in compression.

The normal screw threaded end of the air valve stem of the tire is indicated by 16, to which I secure a pipe 17, through the medium of a union 18. The union 18 has a packing washer 19 and engages the head 20 of a tubular stem 21 fixed in the end of the pipe 17 and itself containing a closely fitting member 22, Figs. 3, 4, of cruciform cross section.

This cruciform section abuts against the end 15 of the valve stem 14 and when the connection is properly secured the air passage way into the normal valve stem of a rubber tire from a pipe 17, is held open at all times as long as the union 18 is in place. It is however obvious that while thus fully screwing home the coupling 18 forces the valve open, if the coupling be not quite home, or if when home it be partially unscrewed, the member 22 will be withdrawn from the end 15 of the valve stem permitting the valve to close. The cruciform section 22 serves the purpose of lifting this valve stem 14 as the union 18 is screwed home on to the end 16 of the normal air valve stem, so that when the pipe 17 is in place in connection with the stem 3, the air within the tire is at liberty to flow out through the entire length of the pipe 17.

I provide a secondary air stem indicated by 23, which extends out through the side flanges of the rim and is covered by a dust cap 24' which simulates the appearance of one of the screws 6 used for holding the rim in place. This stem 23 is a part of a casting 24 which has side flanges indicated by 25 in dotted lines in Figure 1 and which flanges are secured by rivets 26 to the flange 5 of the main rim piece 2 in the same manner as are the blocks 7 for the screws 6. This block 24 has a nipple piece 25 to which there is secured a union 26 having a stem 27 connected to the pipe 17, and in the block 24 there is an air passage 28 opening up into a passage 29 that extends out into a larger passage 30 and this larger passage is adapted to contain an air valve arrangement exactly like the one shown and described in the main stem 3.

Further, the arrangement shown for the air valve in the stem 3 is normally held open whenever the pipe 17 is properly connected with the stem 3 and the casting 24 through its proper unions as before described, and then the reliance is placed on the air valve mechanism shown in the passage way 30 for the control of the air to the inner tube of the tire.

The cap 24' is provided with an elastic washer or packing ring 31 to hold it tightly on to the nipple end 23, and when it is desired to inflate or deflate the tire this cap is removed and access is had to the nipple 23 in the same manner at it might be had to the nipple end 16 of the normal valve stem 3 and thus the tire may be inflated or deflated and the pressure gauge applied to measure the tire pressure from the outside of the wheel without the necessity of getting direct access to the valve stem 3 which is behind the disk 1.

When the tire is to be removed and replaced, tire deflation is first brought about by removing the cap 24 and actuating the valve stem of a secondary valve in the general manner of actuating the valve in the stem itself. After deflation has taken place the union 18 is disconnected from the threads of the nipple 16 of the valve stem 3 and the tire is then removed by the ordinary methods.

In the case of a straight side tire the flange 4 would be removed and the tire taken off in the ordinary way.

Whenever the union 18 is disconnected from the nipple 16 the valve in the stem 3 immediately is restored to normal position and thus the control of the air entrance to the inner tube is substantially the same as before its application to my wheel in connection with my device as shown.

This is necessary in order to properly inflate the tube and discover leaks when the tube is separated from the wheel. If it were only to inflate the tire from the outside of the disk, then use might be made of the valve normally in the stem 3 without any valve in the block 24, but in pretty nearly every instance of inflation, it is desired to know the pressure carried in the tire and in order to apply the pressure gauge it is just as much trouble to get at the main valve stem as it is to apply the air hose thereto, so little is gained by any sort of a device which relies on using the normal valve in the normal stem. By my invention I use the normay valve stem of the tire and by the addition of my pipe 17, a secondary valve located in the margin of the rim, I am permitted to inflate and deflate and measure the pressures of the tire directly from the outside.

The act of screwing on the union 18 brings the block or projection 22 into engagement with the end 15 of the valve stem 14 and thus, as it were, makes neutral the valve in the stem 3 and allows the secondary valve in the block 24 to perform all the functions normally taken care of by the valve in the stem 3, which is a great desideratum. Whenever it becomes necessary to replace the "valve insides" of my secondary valve, the valve in the stem 3 may be temporarily closed by partially unscrewing the union 18, thus avoiding the complete deflation and reinflation of the tire.

What I claim is:—

A disk wheel carrying a pneumatic tire the valve stem of which is behind the disk, said wheel being of the type which is secured together by a circular series of bolts, one of said bolts being omitted and the hole therefor occupied by an extension attached to the valve stem of the tire whereby the tire may be inflated from the front of the wheel and the symmetry of appearance is maintained.

Signed at Chicago, in the county of Cook and State of Illinois, this 23rd day of January, 1920.

WILLIAM ERASTUS WILLIAMS.